No. 12,441 REISSUED JAN. 30, 1906.
C. C. JACOBS.
EXCAVATING MACHINE.
APPLICATION FILED DEC. 26, 1905.
6 SHEETS—SHEET 1.
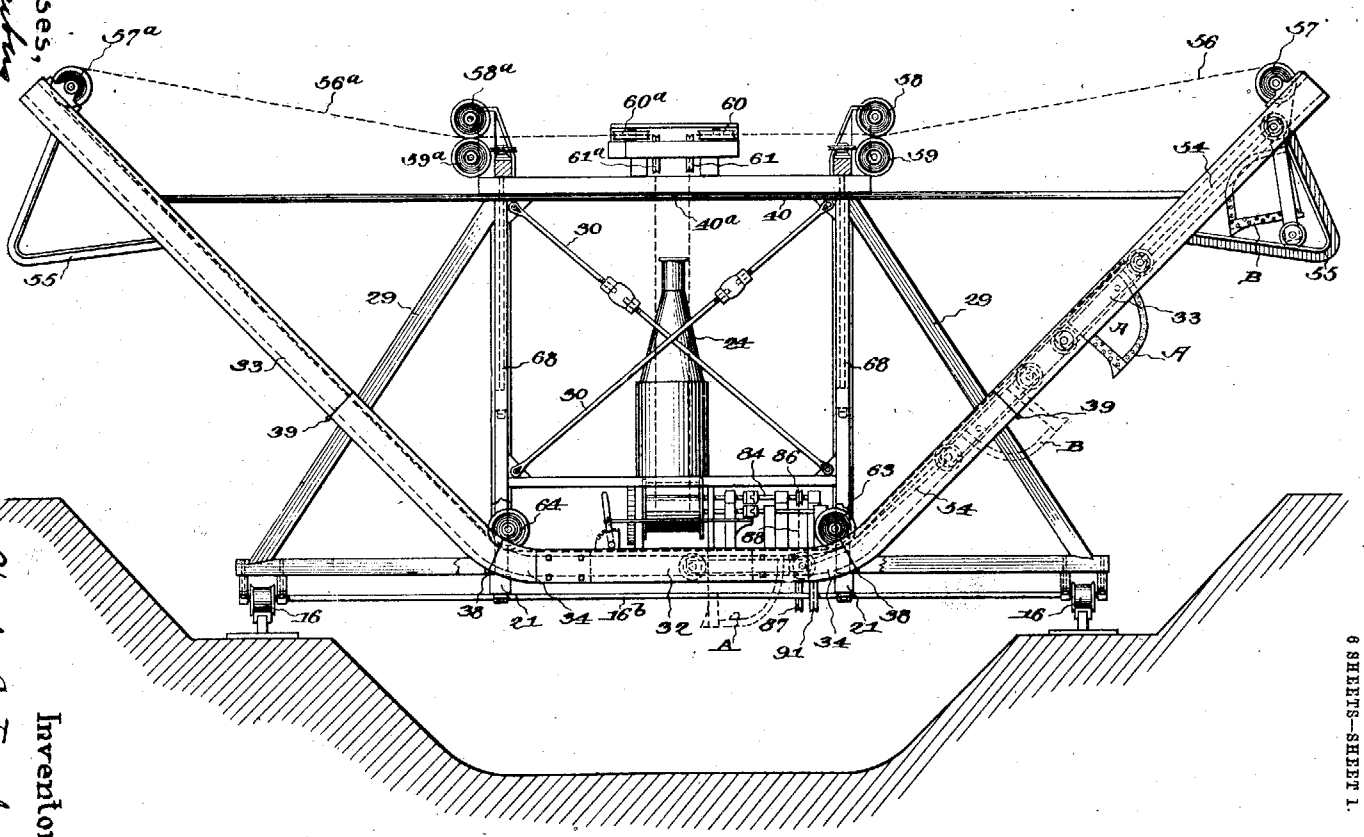
FIG. I.
Wilnesses,
P. C. Freeburg
A. D. Sigmaker
Inventor:
Charles C. Jacobs
by Chas. G. Page
atty.

No. 12,441. REISSUED JAN. 30, 1906.
C. C. JACOBS.
EXCAVATING MACHINE.
APPLICATION FILED DEC. 26, 1905.
6 SHEETS—SHEET 2.
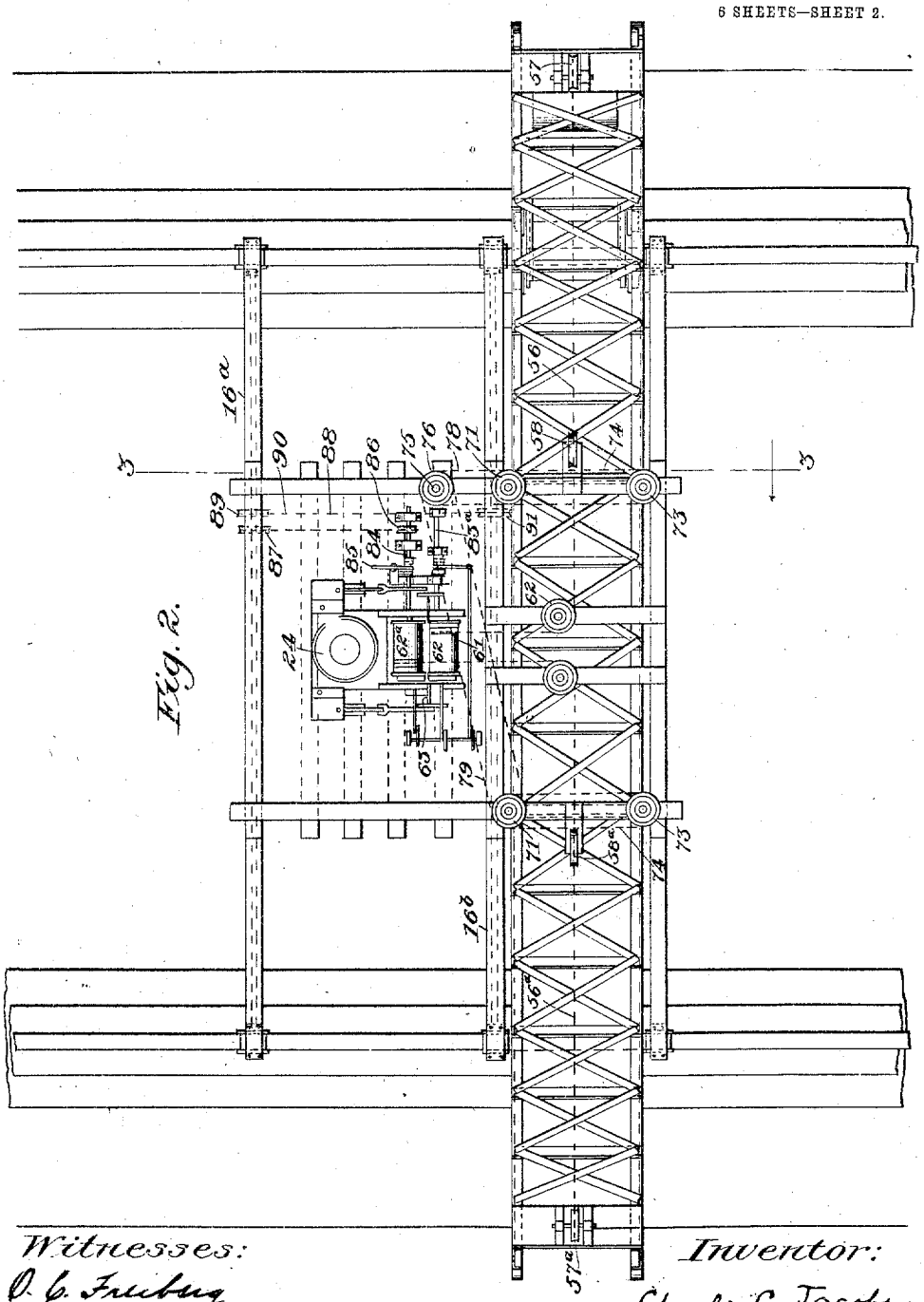
Witnesses:
O. C. Freiburg
A. D. Seymour
Inventor:
Charles C. Jacobs
by Chas. G. Page
atty.

No. 12,441. REISSUED JAN. 30, 1906.
C. C. JACOBS.
EXCAVATING MACHINE.
APPLICATION FILED DEC. 26, 1905.
6 SHEETS—SHEET 3.
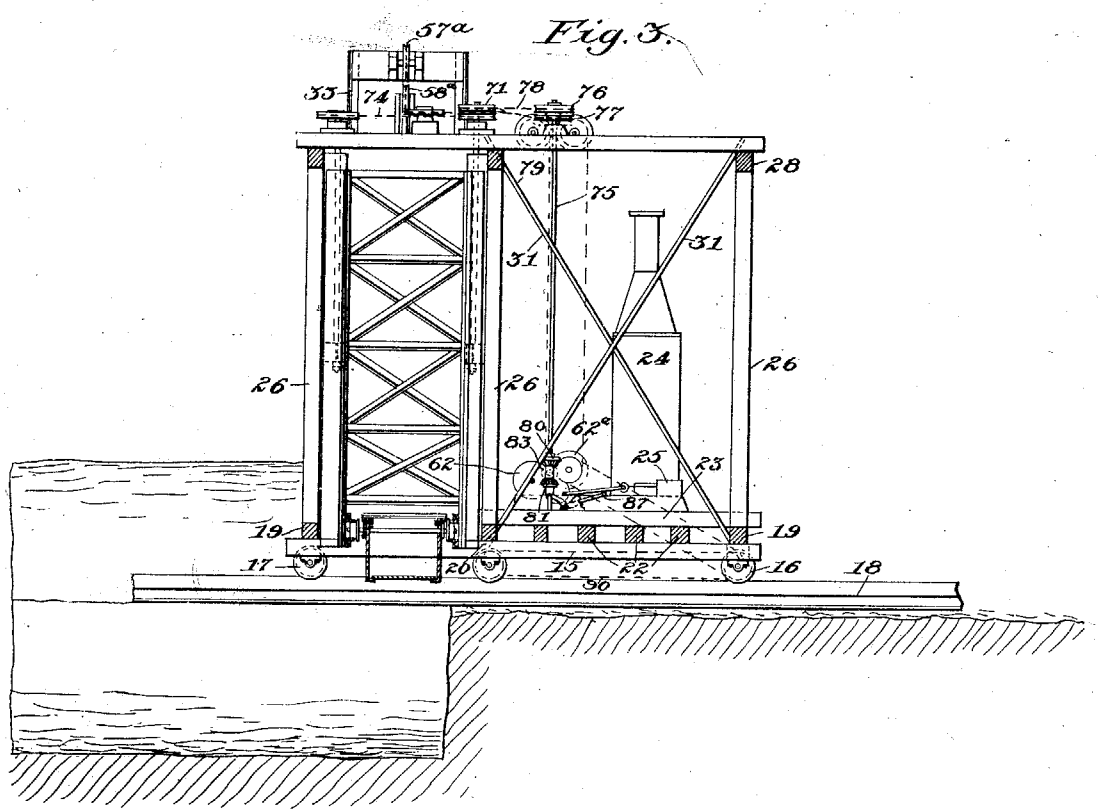
Witnesses:
O. C. Freiberg
A. B. Sigmund
Inventor:
Charles C. Jacobs
by Chas. G. Page
Atty.

No. 12,441. REISSUED JAN. 30, 1906.
C. C. JACOBS.
EXCAVATING MACHINE.
APPLICATION FILED DEC. 26, 1905.
6 SHEETS—SHEET 4.
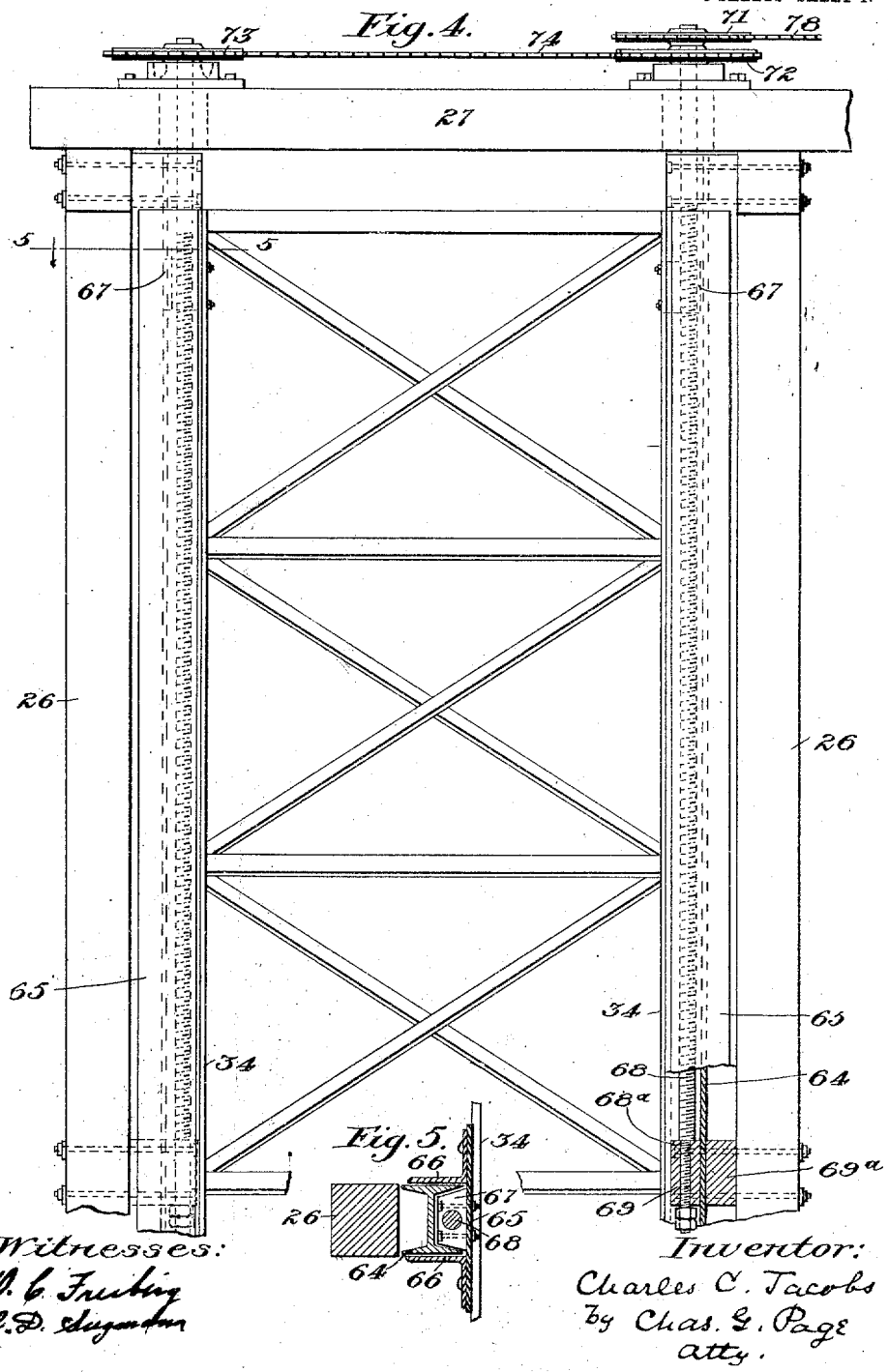
Witnesses:
P. C. Freiling
R. D. Sayman
Inventor:
Charles C. Jacobs
by Chas. G. Page
atty.

No. 12,441. REISSUED JAN. 30, 1906.

C. C. JACOBS.

EXCAVATING MACHINE.

APPLICATION FILED DEC. 26, 1905.

6 SHEETS—SHEET 5.

Witnesses:
P. C. Freiberg
A. D. Seymour

Inventor:
Charles C. Jacobs
by Chas. G. Page
atty.

No. 12,441. REISSUED JAN. 30, 1906.
C. C. JACOBS.
EXCAVATING MACHINE.
APPLICATION FILED DEC. 26, 1905.
6 SHEETS—SHEET 6.
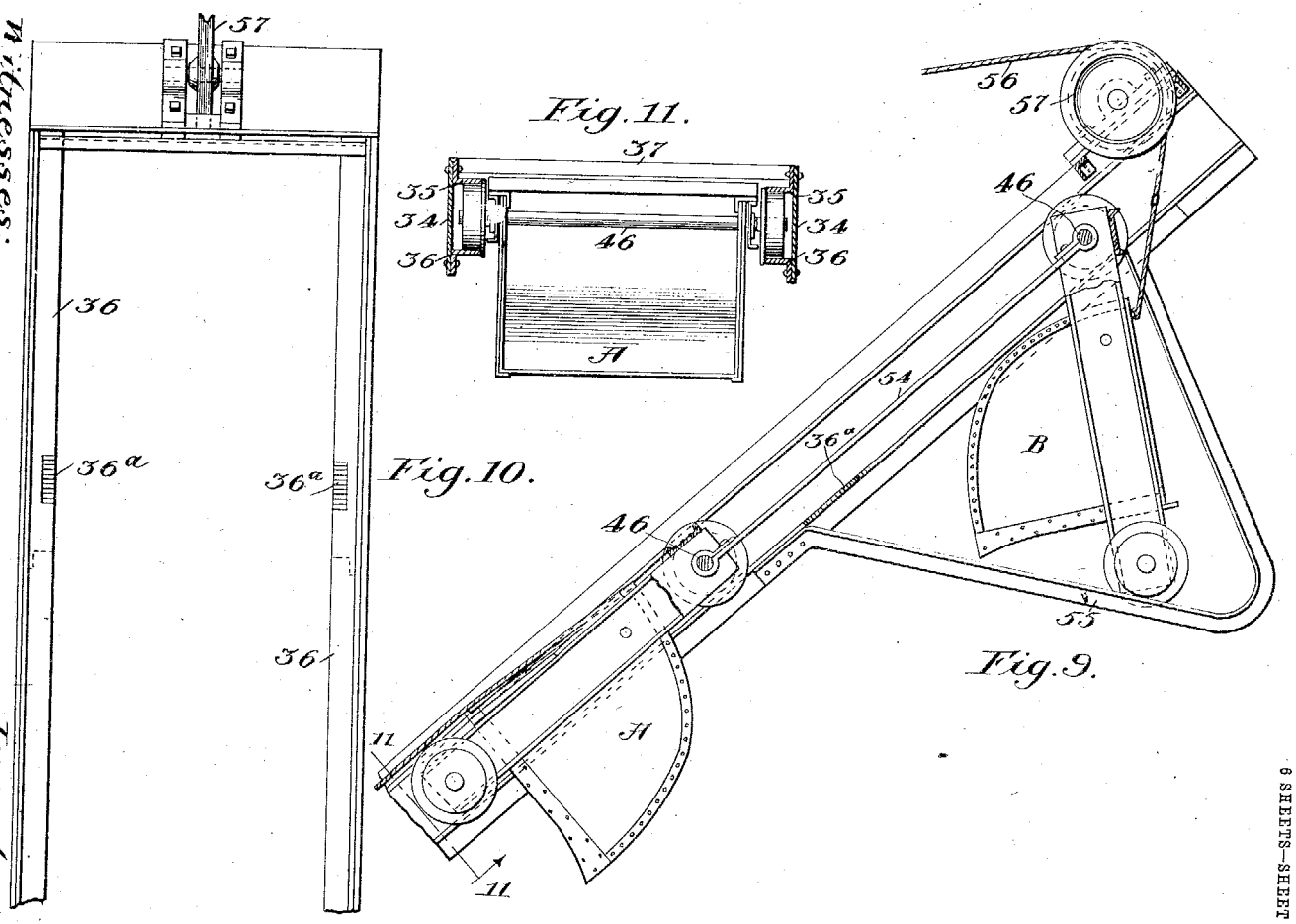
Witnesses:
V. C. Fuiberg
A. D. Sugrue
Inventor:
Charles C. Jacobs
by Chas. G. Page
Atty.

UNITED STATES PATENT OFFICE.

CHARLES C. JACOBS, OF AMBOY, ILLINOIS, ASSIGNOR TO THE JACOBS' STEEL EXCAVATOR COMPANY, OF AMBOY, ILLINOIS, A CORPORATION OF ILLINOIS.

EXCAVATING-MACHINE.

No. 12,441 Specification of Reissued Letters Patent. Reissued Jan. 30, 1906.

Original No. 794,410, dated July 11, 1905. Application for reissue filed December 26, 1905. Serial No. 293,423.

*To all whom it may concern:*

Be it known that I, CHARLES C. JACOBS, a citizen of the United States, residing at Amboy, in the county of Lee and State of Illinois, have invented certain new and useful Improvements in Excavating-Machines, of which the following is a specification.

My invention relates to excavating-machines of the class or type known as "ditching-machines," wherein the dirt is raised and discharged by one or more buckets having a cutting edge; and the invention has special reference to the method of control and operation of the excavator-buckets, having for its leading objects, first, the minimizing of power required to fill and actuate excavator-buckets during the operation of removing earth or other material from canals or other excavations; second, to minimize labor and time required in the operation of the said excavator-buckets; third, to control the vertical, longitudinal, and lateral movements of said buckets in such manner as to accurately conform with the alinement, grade, and side slopes of canals and other excavations. I attain these objects by the mechanism illustrated in the accompanying drawings, wherein—

Figure 6:
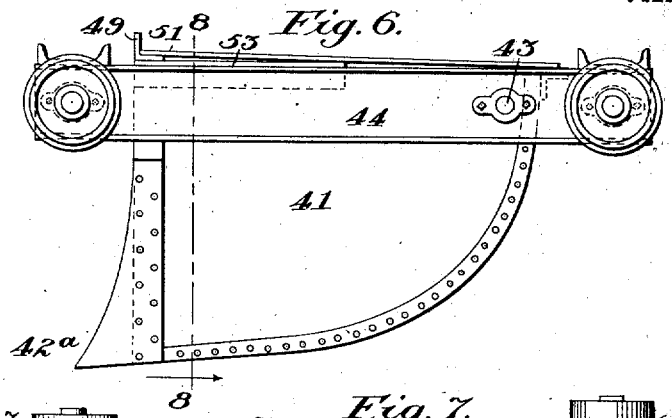
Figure 7:
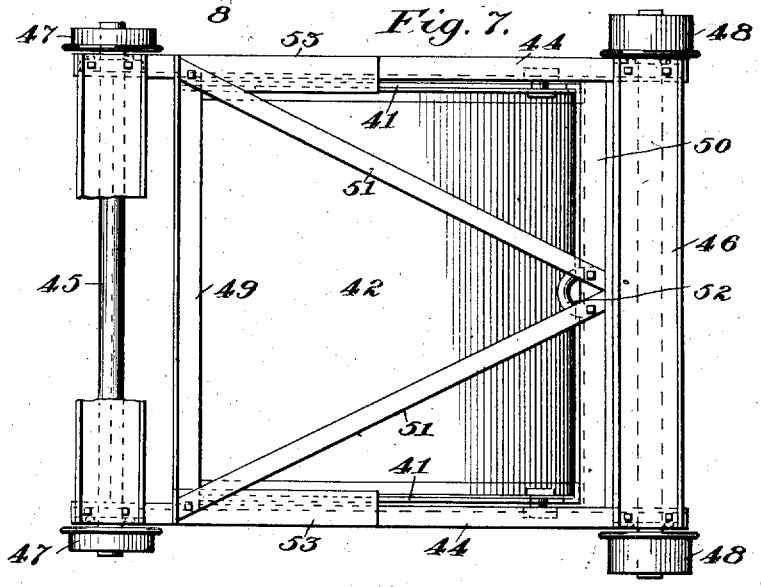
Figure 8:
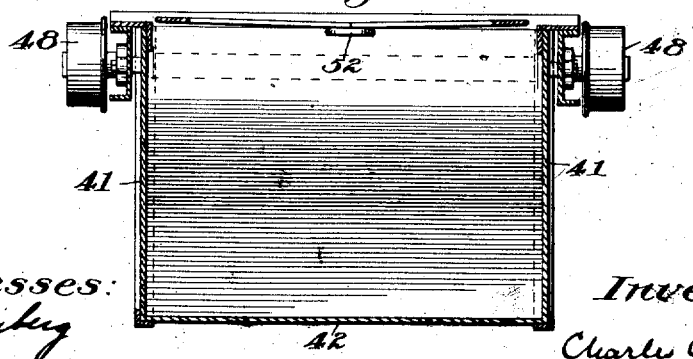

Figure 1 is an end elevational view, partly broken away, of the complete machine. Fig. 2 is a top plan view. Fig. 3 is a side elevation, partly in vertical section, on the line 3 3 of Fig. 2. Fig. 4 is an enlarged side elevational view of the upper portion of the main supporting-frame, more particularly illustrating the means for raising and lowering the transverse bucket-carrier frame. Fig. 5 is a cross-sectional detail view on the line 5 5 of Fig. 4. Figs. 6 and 7 are respectively side elevation and top plan views of one of the buckets and its truck. Fig. 8 is a vertical sectional view of the same on the line 8 8 of Fig. 6. Fig. 9 is a detail elevational view, enlarged and partly in longitudinal section, of the outer end of the bucket-carrier with the dumping devices carried thereby. Fig. 10 is a top plan view of the parts shown in Fig. 9, and Fig. 11 is a cross-sectional detail view on line 11 11 of Fig. 9.

My invention comprises as its leading distinguishing characteristics a skeleton or open-work frame supported at its opposite sides on wheels traveling on tracks disposed alongside of and parallel with the ditch or trench to be excavated, a transversely-disposed bucket-carrier having a horizontal intermediate portion and upwardly and outwardly inclined end portions overlying the sides or banks of the trench, this carrier conforming in shape to the contour of the trench to be dug and being vertically adjustable on the main supporting-frame, with a pair of buckets mounted to travel back and forth on a track on said carrier, said buckets alternately scraping or shaving the surface of the excavation in a crosswise direction as they travel to and fro, automatically dumping and depositing the gathered earth at the outer ends of their travel. The machine is also provided with means whereby it is self-propelling along the track from one cutting position to the next.

Turning to the drawings for a more specific description of the parts comprising the apparatus, 15, Fig. 3, designates each of a pair of longitudinal sills in the under sides of which are journaled carrying-wheels 16 and 17, adapted to travel on the rails 18 of a track disposed alongside the ditch, said sills being connected by end sills 19 and an intermediate transverse sill 20. Suspended from the under sides of one of the end sills 19 and the intermediate sill 20 are a pair of longitudinally-extending joists 21, Fig. 1, which support a series of transverse joists 22, on which is laid a platform 23, supporting a boiler 24 and engine 25. From the corners of the platform 23 and the rear end sill 19 rise a series of posts 26, which are connected together at their upper ends by longitudinal and transverse joists 27 and 28, respectively.

29 represents oblique braces extending from the upper ends of the uprights 26 laterally to the outer ends of the horizontal transverse sills 19 and 20. Other tension brace-rods 30 connect the diagonally opposite corners of the rear and intermediate uprights 26 in a direction transversely of the frame, while other tension brace-rods 31, Fig. 3, similarly connect the diagonally opposite corners of the front and intermediate uprights 26.

In and between the rear and intermediate pairs of uprights 26 is disposed a transversely-extending bucket-carrier, consisting generally of a track-supporting frame having a horizontal section 32 and upwardly and outwardly inclined sections 33, overhanging the bank on either side of the ditch. More specifically, this bucket-carrier, as herein shown, is made up of a pair of bent side bars or plates 34, Fig. 11, to the inner sides of which are riveted upper and lower angle-irons 35 and 36, said bars 34 being connected and rigidly spaced by lattice-work 37. The angle-irons 36 constitute tracks for the trucks of the buckets, hereinafter described, the angle-irons 35 constituting coöperating guiding and confining members for said trucks. The inclined sections 33 are preferably hinged to the intermediate horizontal section 32 at points indicated at 38, and the inclined sections 33 may also have a hinge-joint 39 intermediate their ends. The joints 38 determine the inclination of the inclined sections 33 as a whole, which in turn determines the angular inclination of the side slopes of the ditch or trench, and the joints 39 determine the inclination of the outer portion of the arms 33, which in turn determines the height from which the buckets are discharged and the distance to which the excavated material is deposited laterally of the trench. The upper ends of the arms 33 are connected by a tie-bar 40, made in two sections and adjustably united at 40ª to provide for the angular adjustment of said arms, as already described.

On the track of the bucket-carrier are adapted to travel a pair of cutting and excavating-buckets working in opposite directions and designated as entireties by the letters A and B, respectively. As these buckets and their supporting trucks are duplicates, differing only in their relative positions upon the track, a description of one will suffice for both. Turning to Figs. 6, 7, and 8, which illustrate the buckets in detail, 41 designates the side walls, and 42 the concave integral bottom and rear wall, of the bucket, the latter terminating at its lower end in a forwardly-projecting transverse cutting edge 42ª. It will thus be seen that the bucket is open on top and at its advance end. This bucket is hinged at the rear upper portion of its side walls by pivot-bolts 43 between the parallel side bars of a rectangular truck-frame 44, the overhanging ends of said side bars having mounted therein front and rear axles 45 and 46, respectively, carrying on their outer ends wheels 47 and 48. It will be noticed that the forward wheels 47 are of narrower tread than the rear wheels 48 for a purpose which will hereinafter appear. Transverse front and rear braces 49 and 50 of the truck-frame are connected by diagonal braces 51, and a clevis 52 is secured to the cross-brace 50 directly beneath the meeting ends of the diagonal braces 51. To the upper forward ends of the side walls 41 of the bucket are secured flanges 53, adapted to overlie the upper edges of the side bars 44, and thus sustain the forward end of the bucket with provision for some vertical play to prevent possible injury to the bucket on its idle or return travel. These buckets, as will be seen by reference to the dotted-line positions thereof indicated in Fig. 1, are located on the track of the carrier, so as to face in opposite directions, and the rear axles 46 of the two buckets are connected by one or more links 54, as plainly shown in Fig. 9. The lower track-bars 36 on the inclined sections 33 of the carrier are provided near their outer ends with holes 36ª, Fig. 10, wide enough to permit the forward wheels 47 of the bucket-carrying trucks to fall therethrough, but narrow enough to allow the wider rear wheels 48 to travel thereover. To the under side of the inclined carrier-sections 33 and beneath and beyond the openings 36ª are secured V-shaped frames 55, provided with supporting-tracks, on which the forward wheels 47 may run after falling through the apertures 36ª to guide the buckets to dumping position.

Considering now the means for actuating the buckets, 56 designates a cable, the course of which may be traced as follows: At one end it is secured to the clevis 52 of the bucket B, passing thence upwardly and outwardly over a guide-sheave 57 on the upper end of the right-hand wing 33 of the bucket-carrier, thence inwardly between a pair of grooved guide-sheaves 58 and 59, suitably mounted on the upper portion of the central supporting-frame of the machine, thence around a horizontal sheave 60, thence forwardly and over a vertical sheave 61, and thence downwardly to and around a winding-drum 62. 56ª designates the companion cable, which is similarly connected to the clevis 52 of the other bucket A, passing thence downwardly beneath a pair of vertical guide-sheaves 63 and 64, mounted above the ends of the horizontal carrier-section 32, thence upwardly along the left-hand inclined section 33, engaging pulleys 57ª, 58ª, 59ª, 60ª, and 61ª, and thence passing downwardly and secured to a companion winding-drum 62ª, disposed alongside of the drum 62, and so geared as to rotate simultaneously in an opposite direction to the latter. The drums 62 and 62ª are geared to the main driving-shaft of the engine (indicated at 63) by clutch-controlled gearing well known and understood in this art, whereby by shifting the hand-lever the relative directions of rotation of said drums may be reversed or stopped altogether to effect the proper reciprocations and rests of the buckets A and B.

In the operation of the machine the transverse bucket-carrier has a bodily vertical movement on its supports, the carrier occupying its highest position at the beginning of the digging movement of the buckets and being gradually lowered a step at a time between successive transverse cutting movements of the buckets until the full predetermined depth of the ditch or trench is attained. Thereafter the carrier is raised bodily to its full height, the machine moved another step in advance, and the same operations repeated. The means herein illustrated for mounting the bucket-carrier with such capacity for vertical movement are principally illustrated in Figs. 4 and 5 and consists of the following mechanism: Parallel with and against the inner faces of the posts 26 on either side of the machine are secured a pair of vertical guides, herein shown as I-beams 64. Secured to the outer face of each of the parallel main carrier side bars 34 is an upright channel-guide consisting of a flat bar 65, to the outer face of which is secured a pair of angle-irons 66, constituting the side walls of the channel, said side walls slidingly engaging the heads of the I-beam guides 64, as plainly shown in Fig. 5. Secured to the inner or base wall of the channel near the upper end thereof is a stationary nut 67, containing an internally-threaded vertical aperture, which is engaged by a threaded rod 68, the upper end of which is journaled in the upper cross-bar 37, while its lower end 68[a] is reduced in diameter and rotatably mounted in an intermediate bearing-block 69, bolted to the upright 26, an intermediate filling-block 69[a] being interposed behind the web of the I-beam. The lower end or spindle 68[a] of the rod 68 is threaded at its tip to receive nuts 70, which confine the rod against bodily upward movement. The inner rod 68 of each pair has fast on its upper end a pair of upper and lower sprockets 71 and 72, respectively, while the outer rod of each pair carries a single sprocket 73. The sprockets 72 and 73 on each side are connected by an endless sprocket-chain 74, whereby the rods 68 on each side are simultaneously and equally driven. 75 designates a vertically-extending shaft, Fig. 3, on the upper end of which are mounted a pair of upper and lower sprockets 76 and 77, respectively. The upper sprocket 76 is connected by an endless sprocket-chain 78 with the top sprocket 71 on one side of the machine, while the lower sprocket 77 is similarly connected by an endless sprocket-chain 79 with the top sprocket 71 on the other side of the machine-frame. In this way the rotation of the vertical shaft 75 imparts a simultaneous and equal rotation to all four of the threaded shafts 68. In view of the fact that the bucket-carrier requires to be moved both up and down provision must be made for driving the shaft 75 in either direction, according to the required travel of the bucket-carrier. This may be done by any known and approved motion-reversing mechanism, such a mechanism being indicated in Fig. 3, wherein the shaft 75 is provided with a pair of oppositely-faced bevel-pinions 80 and 81, splined thereon and shiftable by a lever 82 to throw either pinion into engagement with a bevel-pinion 83 on a horizontal counter-shaft 83[a], suitably geared to the driving-shaft 63 of the engine.

It is obvious that as soon as the machine has effected a transverse cut of the required depth it is necessary to raise the bucket-carrier and advance the machine bodily over the track 18 for the excavation of the next succeeding cross-section. To effect this, the axles 16[a], Fig. 1, of the forward and intermediate wheels 16 are suitably geared to the engine, so as to be positively driven thereby when required. In the drawings I have indicated a conventional form of gearing for this purpose, wherein 84 designates a counter-shaft which may be operatively connected with the engine through a clutch, (indicated at 85.) The shaft 84 carries a sprocket 86, which is geared to a larger sprocket 87 on the forward axle 16[a] by a sprocket-chain 88, and a companion sprocket 89 transmits, through a sprocket-chain 90 and sprocket 91, an equal rotation in the same direction to the intermediate axle 16[a]. The propulsion of the machine rearwardly as well as forwardly might be effected, if found necessary or desirable, either by reversing the engine or providing the driving connections with a suitable motion-reversing mechanism, such as that already indicated in connection with the vertical shaft 75.

The operation of the apparatus has been to a considerable extent indicated in connection with the description of its parts and mechanism. Assuming the parts to be in the position indicated in Fig. 1 and the bucket-carrier to be lowered through the rotation of the shafts 68 in the proper direction, the drums will be rotated in a direction to wind up the cable 56[a] and pay out the cable 56. This will draw the advancing bucket A into the trench, while the rear bucket B will follow idly, rear end foremost. The bucket A in crossing the trench will shave off a layer of earth of a thickness sufficient to constitute a load for the bucket, which will then be drawn up by the left-hand wing or arm of the carrier until the discharger 55 is reached, whereupon the forward wheels will drop through the apertures 36[a] of the track running onto the guide 55, while the rear wheels of the truck, being of wider tread, will pass over the apertures, and the bucket will thus be inverted and will dump its load in the manner indicated at the right in Fig. 1. The driving connections for lowering the bucket-carrier will then be given a limited operation sufficient to lower the carrier to a proper position to remove the next shaving of earth, whereupon the direction of rotation of the drums will be reversed, so as to draw in the cable 56 and pay out the cable 56[a]. The buckets A and B, with the latter foremost and operative, will then be drawn back across the trench, and the bucket B will discharge its load in the manner indicated in Fig. 1. These operations are repeated until the desired depth is attained, whereupon the bucket-carrier will be raised to its highest position and the machine-propelling connections will be thrown into engagement with the engine to advance the machine another step for the similar excavation of the next cross-section, whereupon the above-described series of operations will be repeated.

From the foregoing it will be seen that the machine effects a clean, sharp, and positive cut, making a trench with a flat bottom and uniformly sloped or inclined sides, the degree of inclination of the latter being adjustable within certain limits by varying the inclination of the wings 33, but always presenting smooth and uniform side slopes or banks. The excavated material is discharged to a considerable distance landward, which may be varied within limits by changing the inclination of the outermost sections of the wings 33. The machine may also readily be constructed to provide for the excavation of ditches or trenches of varying width by rendering the intermediate horizontal section 32 of the bucket-carrier adjustable as to length, as indicated in Fig. 1, with suitable provisions for adjusting inwardly and outwardly to the same extent the side wings 33 to fit any predetermined lengths of intermediate section 32.

The machine as herein described and shown is mounted on rails, adapting it to the excavation of a surface ditch or trench; but it is obvious that the apparatus might be mounted on one end of a barge and the bucket-carrier lowered so as to effect the excavation of material from the bottom of the stream or other body of water to increase the depth of the latter for navigation or other purposes.

It is evident that the machine as described and shown may be very considerably varied in respect to details of construction and relative arrangement of parts without departing from the principle of the invention or sacrificing any of the advantages thereof. Hence I do not limit the invention to the precise constructions and arrangements as shown and described except to the extent indicated in specific claims.

With further reference to the arrangement and operation of the two connected excavating scoops or buckets the drawings show them relatively spaced or held apart by links 54; also, that each of said excavating scoops or buckets can tilt independently of the other and that the link connections form articulated or flexible connections whereby a bend or flexure may occur in the line of buckets, so as to permit them to conform to the guide and also conform to the transverse curvature of the ditch when the guide is arranged transversely to the trench-line. For example, while one scoop or bucket is moving down a straight inclined side wall portion of the ditch the other scoop can be traveling across either a transversely-curved or a transversely-plane bottom portion of the ditch, it being obvious that in such case there is a relative tilt between the two scoops or buckets and that this is permitted by suitable flexible connection in contradistinction to a rigid connection between the two scoops or buckets. Also when the scoops or buckets descend from the position shown in Fig. 1 the bucket which is ahead will upon reaching the first bend in the guide-track tilt in conformity with such bend, while at the same time the other scoop is traveling down the straight inclined portion of the guide-track.

I claim—

1. In an excavating-machine, the combination with a supporting-frame, of a bucket-supporting track mounted thereon transversely of the ditch or trench to be dug and conforming to the cross-sectional profile of the latter, an excavating-bucket pivotally mounted to travel on said track, and means for drawing said bucket back and forth over said track, substantially as described.

2. In an excavating-machine, the combination with a supporting-frame, of a bucket-supporting track mounted thereon transversely of the ditch or trench to be dug and conforming to the cross-sectional profile of the latter, an excavating-bucket mounted to travel on said track, means for drawing said bucket back and forth over said track, and automatic bucket-discharging means on the end of said track, substantially as described.

3. In an excavating-machine, the combination with a supporting-frame, of a bucket-supporting track mounted thereon transversely of the ditch or trench to be dug and conforming to the cross-sectional profile of the latter, a pair of oppositely-faced excavating-buckets pivotally mounted to travel on said track, one of said buckets cutting and filling and the other returning idly on each travel across the ditch, and means for drawing said buckets back and forth over the track, substantially as described.

4. In an excavating-machine, the combination with a supporting-frame, of a bucket-supporting track mounted thereon transversely of the ditch or trench to be dug and conforming to the cross-sectional profile of the latter, a pair of oppositely-faced excavating-buckets pivotally mounted to travel on said track, one of said buckets cutting and filling and the other returning idly on each travel across the ditch, a link connecting said buckets, and means for drawing said buckets back and forth over the track, substantially as described.

5. In an excavating-machine, the combination with a supporting-frame, of a bucket supporting and guiding track mounted thereon transversely of the ditch or trench to be dug and conforming to the cross-sectional profile of the latter, means for bodily raising and lowering said track in a vertical plane by a single operation, an excavating-bucket mounted to travel on said track, and means for drawing said bucket back and forth over the latter, substantially as described.

6. In an excavating-machine, the combination with a supporting-frame, of a bucket supporting and guiding track mounted thereon transversely of the ditch or trench to be dug and conforming to the cross-sectional profile of the latter, means for bodily raising and lowering said track in a vertical plane, a pair of oppositely-faced connected excavating-buckets mounted to travel on said track, one of said buckets cutting and filling and the other returning idly on each travel from end to end of the track, and means for drawing said buckets back and forth over the latter, substantially as described.

7. In an excavating-machine, the combination with a supporting-frame, of a bucket supporting and guiding track mounted thereon transversely of the ditch or trench to be dug and conforming to the cross-sectional profile of the latter, automatic bucket-discharging means on each end of said track, means for raising and lowering said track, a pair of oppositely-faced connected excavating buckets or scoops mounted to travel on said track, one of said buckets cutting and filling and the other returning idly on each travel from end to end of the track, and means for drawing said buckets back and forth over the track, substantially as described.

8. In an excavating-machine, the combination with a supporting-frame, of a bucket supporting and guiding track mounted thereon transversely of the ditch or trench to be dug and conforming to the cross-sectional profile of the latter, means for bodily raising and lowering said track in a vertical plane by a single operation, an excavating bucket or scoop mounted to travel on said track, means for drawing said bucket back and forth over said track, and means for advancing the machine bodily from one cutting position to another, substantially as described.

9. In an excavating-machine, the combination with a supporting-frame, of a bucket-carrier mounted thereon and comprising a transversely-extending frame consisting of a horizontal intermediate section and upwardly and outwardly inclined end sections, a track comprising supporting and guiding rails extending from end to end of said carrier-frame, a truck mounted to travel on said track, a depending excavating bucket or scoop pivotally mounted on said truck, and means for drawing the truck back and forth over the track, substantially as described.

10. In an excavating-machine, the combination with a supporting-frame, of a bucket-carrier mounted thereon and comprising a transversely-extending frame consisting of a horizontal intermediate section and upwardly and outwardly inclined end sections adjustable relatively to said intermediate section, a track comprising supporting and guiding rails extending from end to end of said carrier-frame, a truck mounted to travel on said track, a depending excavating bucket or scoop mounted on said truck, and means for drawing the truck back and forth over the track, substantially as described.

11. In an excavating-machine, the combination with a supporting-frame, of a bucket-carrier mounted thereon and comprising a transversely-extending frame consisting of a horizontal intermediate section and upwardly and outwardly inclined end sections, said end sections being hinged to said intermediate section so as to be angularly adjustable relatively thereto, a track comprising supporting and guiding rails extending from end to end of said carrier-frame, a pair of connected trucks mounted to travel on said track, oppositely-faced excavating buckets or scoops yieldably mounted on and depending from said trucks, and means for drawing said trucks back and forth over the track, substantially as described.

12. In an excavating-machine, the combination with a supporting-frame and a transversely-disposed bucket-carrier mounted thereon, of a continuous track on said carrier having openings formed in the supporting-rails of the track near its ends, a bucket-supporting truck mounted to travel on said track and having wheels of different widths of tread at its opposite ends, one pair of wheels being adapted to drop through said openings of the track and the other pair to ride over the latter, and an auxiliary track adapted to support the narrow wheels of the truck and guide the bucket into discharging position, substantially as described.

13. In an excavating-machine of the class described, the combination with a bucket supporting and guiding track, of a truck mounted to travel thereon, an open-faced bucket or scoop pivotally mounted at its rear end between the side bars of said truck, and means affording a limited play of the forward end of said scoop transversely of the truck-frame, substantially as described.

14. In an excavating-machine of the class described, the combination with a bucket supporting and guiding track, of a pair of trucks mounted to travel thereon, a link connecting the inner adjacent axles of said trucks, a pair of open-faced excavating buckets or scoops pivotally and oppositely mounted in said trucks, respectively, and cables connected to said trucks and serving to alternately actuate the latter from end to end of said track, substantially as described.

15. In an excavating-machine, the combination with a supporting-frame, of a bucket supporting and guiding track mounted thereon transversely of the ditch or trench to be dug and conforming to the cross-sectional profile of the latter, screw-threaded rods rotatably mounted in said frame and supporting said track, means for rotating said rods whereby to bodily raise and lower said track, an excavating-bucket mounted to travel on said track, and means for drawing said bucket back and forth over the latter, substantially as described.

16. In an excavating-machine, the combination with a supporting-frame, of a bucket-carrier mounted thereon and comprising a transversely-extending frame consisting of a lengthwise-adjustable horizontal intermediate section, and upwardly and outwardly inclined end sections, a bucket-supporting track extending from end to end of said bucket-carrying frame, and a bucket or scoop mounted to travel over said track, substantially as described.

17. In an excavating-machine, the combination with a supporting-frame, of a bucket supporting and guiding track mounted thereon transversely of the ditch or trench to be dug and conforming to the cross-sectional profile of the latter, means for bodily raising and lowering said track in a vertical plane by a single operation through successive parallel positions, an excavating-bucket mounted to travel on said track, and means for drawing said bucket back and forth over the latter, substantially as described.

18. In an excavating-machine, the combination with a supporting-frame, of a bucket-supporting track mounted thereon transversely of the ditch or trench to be dug and conforming to the cross-sectional profile of the latter, a pair of excavating-buckets mounted to travel on said track, and means for discharging said buckets one at each end of the track, respectively.

19. In an excavating-machine for digging ditches, the combination with a supporting-frame, of a guide-track supported thereby and arranged transversely to the trench-line and conformable to the transverse contour of the trench; a pair of oppositely-facing excavating-buckets supported to travel back and forth along said guide-track; and flexible connection between the buckets permitting them to individually conform in their travel to deviations from a right line in the longitudinal contour of the guide-track.

20. In an excavating-machine for digging ditches, the combination with a supporting-frame, of a guide-track supported thereby and arranged transversely to the trench-line and conforming to the transverse contour of the trench; a pair of oppositely-facing and relatively spaced excavating-buckets supported to travel along said guide-track; flexible connection between the buckets permitting them to individually conform in their travel to deviations from a right line in the longitudinal contour of the guide-track; and means for drawing the pair of excavating-buckets back and forth along the track.

CHARLES C. JACOBS.

Witnesses:
WILLIAM A. GREEN,
JENNIE A. CHAPIN.